(12) United States Patent
Bumb et al.

(10) Patent No.: US 11,141,694 B2
(45) Date of Patent: Oct. 12, 2021

(54) SYSTEM AND PROCESS OF CAPTURING CARBON DIOXIDE FROM FLUE GASES

(71) Applicant: CARBON CLEAN SOLUTIONS LIMITED, Reading (GB)

(72) Inventors: Prateek Bumb, London (GB); James Jonathan Hall, London (GB); Ausula Ramesh Kumar, Mumbai (IN); Shailesh Lohare, Maharastra (IN); Richard Mather, South Yorkshire (GB)

(73) Assignee: CARBON CLEAN SOLUTIONS LIMITED, Reading (GB)

(*) Notice: Subject to any disclaimer, the term of this patent is extended or adjusted under 35 U.S.C. 154(b) by 226 days.

(21) Appl. No.: 16/450,484

(22) Filed: Jun. 24, 2019

(65) Prior Publication Data

US 2019/0388836 A1 Dec. 26, 2019

(30) Foreign Application Priority Data

Jun. 26, 2018 (IN) .............................. 201811023872
Aug. 24, 2018 (GB) ..................................... 1813839

(51) Int. Cl.
*B01D 53/18* (2006.01)
*B01D 53/62* (2006.01)
*B01D 53/83* (2006.01)

(52) U.S. Cl.
CPC ............. *B01D 53/62* (2013.01); *B01D 53/18* (2013.01); *B01D 53/83* (2013.01); *B01D 2257/504* (2013.01); *B01D 2258/0283* (2013.01)

(58) Field of Classification Search
CPC .... B01D 53/14; B01D 53/1475; B01D 53/62; B01D 53/83; B01D 53/96;
(Continued)

(56) References Cited

U.S. PATENT DOCUMENTS 5,766,548 A * 6/1998 Soria .................. B01D 53/1412
422/16
9,908,085 B2 * 3/2018 Parisi ..................... B01D 53/96
(Continued)

FOREIGN PATENT DOCUMENTS

| WO | 2012107429 A1 | 8/2012 |
| WO | 2016027164 A1 | 2/2016 |
| WO | 2016154753 A1 | 10/2016 |

OTHER PUBLICATIONS

Search and examination report issued by the UKIPO dated Sep. 26, 2018, for GV1813839.6.
(Continued)

*Primary Examiner* — Timothy C Vanoy
(74) *Attorney, Agent, or Firm* — Bryan D. Zerhusen, Esq.; Cantor Colburn LLP

(57) ABSTRACT

A system and a process for capturing Carbon Dioxide ($CO_2$) from flue gases are disclosed. The process comprises feeding a flue gas comprising $CO_2$ to at least one Rotary Packed Bed (RPB) absorber rotating circularly. A solvent may be provided through an inner radius of the RPB absorber. The solvent may move towards an outer radius of the RPB absorber. The solvent may react with the flue gas in a counter-current flow. The process further includes passing the flue gas through at least one of a water wash and an acid wash to remove traces of the solvent present in the flue gas. Finally, the solvent reacted with the $CO_2$ may be thermally regenerated for re-utilizing the solvent back in the process.

21 Claims, 11 Drawing Sheets

(58) Field of Classification Search
CPC ........ B01D 2252/204; B01D 2257/504; B01D 2259/40088; B01D 2202/00; B01D 5/006; B01D 3/02; B01D 1/00; B01D 2219/00452; B01D 53/06; B01J 19/28; B01J 2219/0059; B01J 2208/028
See application file for complete search history.

(56) References Cited

U.S. PATENT DOCUMENTS

| | | |
|---|---|---|
| 2007/0148069 A1 | 6/2007 | Chakravarti et al. |
| 2011/0303088 A1 | 12/2011 | Mello et al. |
| 2015/0083576 A1* | 3/2015 | Aboudheir ............... B01D 1/06 203/2 |
| 2017/0157554 A1 | 6/2017 | Yu et al. |
| 2017/0173517 A1 | 6/2017 | Wong et al. |

OTHER PUBLICATIONS

Communication Relating to the Results of the Partial International Search for PCT/GB2019/051772, dated Sep. 17, 2019.

* cited by examiner

All % amounts in FIG. 7 are in weight %.

DEEA = 2-(diethylamino)ethanol); MDEA = N-methyl-diethanolamine; AHPD = 2-Amino-2-(hydroxymethyl)-1,3-propanediol; AEPD = 2-amino-2-ethyl-1,3-propanediol; AEP = Amino Ethyl Piperazine

US 11,141,694 B2

SYSTEM AND PROCESS OF CAPTURING CARBON DIOXIDE FROM FLUE GASES

CROSS-REFERENCE TO RELATED APPLICATIONS

This application claims the benefit under 35 U.S.C. 119 to previously filed Indian Patent Application No. 2018-11023872, filed 26 Jun. 2018, and U.K. Patent Application No. 1813839.6, filed 24 Aug. 2018, the contents of which are incorporated herein by reference in their entirety.

FIELD OF THE DISCLOSURE

The present disclosure is generally related to a chemical process and more particularly related to a process of capturing carbon dioxide from flue gases.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

FIG. 1 illustrates a block diagram 100 of a conventional process for capturing Carbon Dioxide ($CO_2$) from flue gases. $CO_2$ is separated from a mixture of gases, using a solvent which selectively reacts with the $CO_2$. After the $CO_2$ has reacted with the solvent, the solvent can be regenerated using heat to release the $CO_2$ and regenerate the solvent for further $CO_2$ processing. A flue gas 102 containing $CO_2$ is contacted with a liquid solvent in a static packed column 104. The liquid solvent is cascaded over a top of the static packed column 104 and falls under gravity to a bottom where it is collected in a sump.

A second static packed column 106 having structured packing comprises wash stages to remove traces of the solvent and volatile chemicals. A gaseous mixture depleted of $CO_2$ passes through the wash stages to remove traces of the solvent and volatile chemicals formed through degradation reactions of the solvent components. Thus, the flue gas 108 depleted of $CO_2$ is released from the top of the static packed column 104. All of the wash stages occur in similar static structured packing and use water or acid for washing.

The solvent is fed into a top section of a stripper column 112 and allowed to fall under gravity over a packing material to a bottom of the stripper column 112. At the bottom, the solvent is drawn into a reboiler 114. Inside the reboiler 114, the solvent is heated to a temperature so that at an operating pressure of the stripper column 112, water present in the solvent gets vaporized to steam. The steam and the $CO_2$ rise to a top of the stripper column 112 where a condenser cools the steam and gas to around 40° C. This condenses the steam into water 116 and gaseous $CO_2$ 118. The condensed water 116 is returned to the top of the stripper column via reflux drum 120 and the gaseous $CO_2$ 118 used for downstream processes while the solvent at the bottom of the stripper is recycled to an absorber as a lean solvent via the heat exchanger 110, ready to repeat the absorption process again.

Utilization of static packed columns in conventional processes provides inefficient mixing of the $CO_2$ present in flue gases and is limited by the gravitational force under which the solvent flows, thus limiting the mass transfer with solvents and during the water and acid washes. Further, the large size of static packed columns used in conventional processes require vast amounts of space and lead to high installation and operational cost of the system. Thus, an improved system and process for capturing $CO_2$ from flue gases are much desired.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
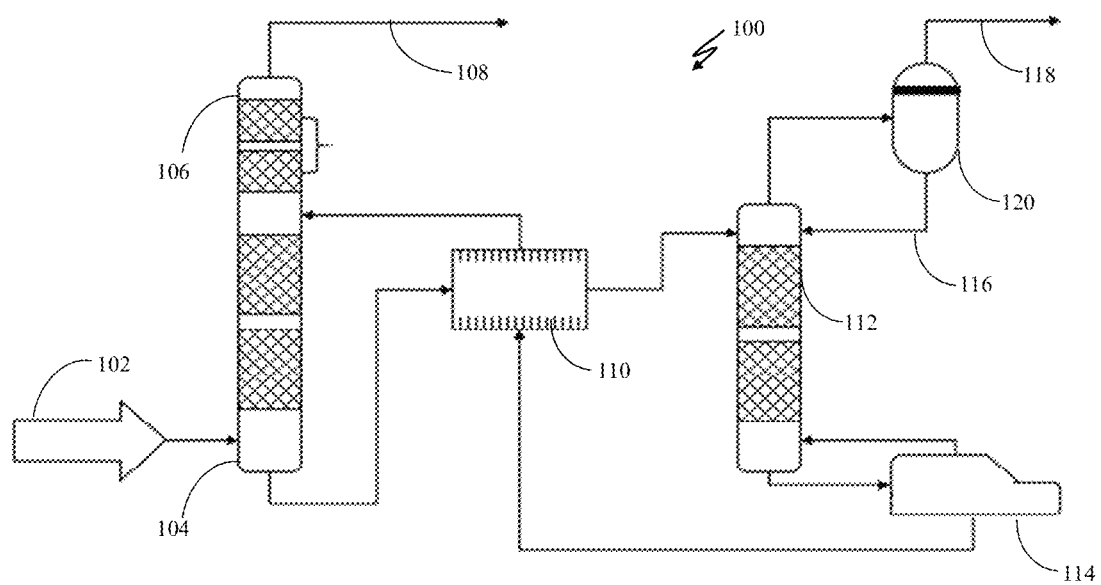
FIG. 1 illustrates a block diagram 100 of a conventional process for capturing Carbon Dioxide ($CO_2$) from flue gases, according to the prior art.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred systems and methods are now described.

According to a first aspect of the present disclosure, there is provided a process of capturing Carbon Dioxide ($CO_2$) from flue gases, the process comprising the step of: feeding a flue gas comprising $CO_2$ to at least one Rotary Packed Bed (RPB) absorber rotating circularly, wherein a solvent provided through an inner radius of the at least one RPB absorber moves towards an outer radius of the at least one RPB absorber, and wherein the solvent reacts with the flue gas in a counter-current flow.

Preferably, wherein the process further comprises the step of: thermally regenerating the solvent reacted with the $CO_2$ for re-utilizing the solvent in the process.

Further preferably, wherein the process further comprises the step of: passing the flue gas through one or both of a water wash and an acid wash to remove traces of the solvent present in the flue gas; optionally, wherein one or both of the water wash and the acid wash are conducted on separate Rotary Packed Beds (RPBs).

Advantageously, wherein a housing of the RPB or RPBs is mounted on a rotatable disk.

Preferably, wherein the step of feeding a flue gas comprising $CO_2$ to at least one Rotary Packed Bed (RPB) absorber rotating circularly comprises feeding the flue gas to two, three, four, five or six Rotary Packed Bed (RPB) absorbers rotating circularly.

Further preferably, wherein the two, three, four, five or six Rotary Packed Bed (RPB) absorbers rotating circularly are arranged in series on a common shaft.

Advantageously, wherein the solvent reacts with the flue gas in a counter-current flow to remove $CO_2$ from the flue gas and form $CO_2$ rich solvent.

Preferably, further comprising the step of: passing the $CO_2$ rich solvent to a stripper, wherein the stripper acts to strip $CO_2$ from the $CO_2$ rich solvent forming $CO_2$ lean solvent.

Further preferably, wherein the stripper is a stripper column; or, a stripper static column; or, an RPB stripper.

Advantageously, wherein the $CO_2$ lean solvent is re-introduced into the at least one Rotary Packed Bed (RPB) absorber rotating circularly.

Preferably, further comprising the step of: passing $CO_2$ rich solvent leaving the at least one Rotary Packed Bed (RPB) absorber to a Rotary Packed Bed (RPB) $O_2$ eliminator; or, a static packed bed $O_2$ eliminator; and eliminating dissolved $O_2$ from the solvent.

Further preferably, wherein the step of passing $CO_2$ rich solvent leaving the Rotary Packed Bed (RPB) absorber to a Rotary Packed Bed (RPB) $O_2$ eliminator; or, a static packed bed $O_2$ eliminator; and eliminating $O_2$ from the solvent eliminates 90% or more of the $O_2$ present in the $CO_2$ rich solvent.

Advantageously, each Rotary Packed Bed (RPB) has the following dimensions: radius: from 0.2 m to 1.25 m, or from 0.2 m to 0.8 m; axial length: from 0.02 m to 1.0 m, or from 0.2 m to 0.6 m; volume: from 0.04 $m^3$ to 4.9 $m^3$, or from 0.04 $m^3$ to 0.6 $m^3$.

According to another aspect of the present invention, there is provided a system for capturing Carbon Dioxide ($CO_2$) from flue gases, the system comprising: at least one Rotary Packed Bed (RPB) absorber configured to rotate circularly, wherein when the RPB rotates circularly a solvent provided through an inner radius of the at least one RPB absorber moves towards an outer radius of the at least one RPB absorber, and wherein the solvent reacts with flue gas in a counter-current flow to capture $CO_2$.

Preferably, wherein the system further comprises: components for thermally regenerating the solvent reacted with the $CO_2$ for re-utilizing the solvent in the process.

Further preferably, wherein the system further comprises: one or both of a water wash and an acid wash, wherein passing the flue gas through one or both of the water wash and the acid wash removes traces of the solvent present in the flue gas.

Advantageously, wherein a housing of the RPB is mounted on a rotatable disk.

Preferably, wherein the system comprises two, three, four, five or six Rotary Packed Bed (RPB) absorbers configured to rotate circularly.

Further preferably, wherein the two, three, four, five or six Rotary Packed Bed (RPB) absorbers configured to rotate circularly are arranged in series on a common shaft.

Advantageously, wherein the solvent reacts with the flue gas in a counter-current flow to remove $CO_2$ from the flue gas and form $CO_2$ rich solvent.

Preferably, further comprising: a stripper, wherein the stripper is configured to strip $CO_2$ from the $CO_2$ rich solvent forming $CO_2$ lean solvent.

Further preferably, wherein the stripper is an RPB stripper.

Advantageously, wherein the system is configured to re-introduce the $CO_2$ lean solvent into the at least one Rotary Packed Bed (RPB) absorber rotating circularly.

Preferably, further comprising: a Rotary Packed Bed (RPB) $O_2$ eliminator; or, a static packed bed $O_2$ eliminator; for eliminating $O_2$ from $CO_2$ rich solvent, the Rotary Packed Bed (RPB) $O_2$ eliminator; or, the static packed bed $O_2$ eliminator; positioned to eliminate $O_2$ from $CO_2$ rich solvent leaving the at least one Rotary Packed Bed (RPB) absorber.

Further preferably, wherein the Rotary Packed Bed (RPB) $O_2$ eliminator; or, a static packed bed $O_2$ eliminator; is configured to eliminate 90% or more of the $O_2$ present in the $CO_2$ rich solvent.

Advantageously, wherein each Rotary Packed Bed (RPB) has the following dimensions: radius: from 0.2 m to 1.25 m, or from 0.2 m to 0.8 m; axial length: from 0.02 m to 1.0 m, or from 0.2 m to 0.6 m; volume: from 0.04 $m^3$ to 4.9 $m^3$, or from 0.04 $m^3$ to 0.6 $m^3$.

The process as described in any one of paragraphs [0020] to [0032], or the system as described in any one of paragraph [0033] to [0045], wherein the solvent comprises: a tertiary amine; and/or, a sterically hindered amine; and/or, a polyamine; and/or, a carbonate buffer salt; and/or, water (optionally deionized water); optionally, water present from 10 wt % to 70 wt %.

Preferably, wherein the solvent has a viscosity from 1 cp to 100 cp.

Further preferably, wherein the solvent: is any solvent disclosed in US 2017/0274317 A1; and/or, the solvent comprises: a tertiary amine (for example, N-methyl-diethanolamine and/or 2-(diethylamino)ethanol), and/or, a sterically hindered amine (for example, 2-amino-2-ethyl-1,3-propanediol, 2-amino-2-hydroxymethyl-1,3-propanediol and/or 2-amino-2-methyl-1-propanol), and/or, a polyamine (for example, 2-piperazine-1-ethylamine and/or 1-(2-hydroxyethyl)piperazine), and/or, a carbonate buffer (for example, potassium carbonate), and/or, water (for example, deionised water).

Advantageously, wherein the solvent comprises: an amino hindered alcohol (optionally, amino-2-methyl-1-propanol), a polyamine (optionally, amino ethyl piperazine) and water.

In another aspect of the present invention, there is provided an arrangement of Rotary Packed Bed (RPB) absorbers comprising two, three, four, five or six RPB absorbers configured to rotate circularly, wherein the RPB absorbers are arranged in series on a common shaft.

In another aspect of the present invention, there is provided a vacuum solvent reclamation system for removing Heat Stable Salts, degradation products and other contaminants from Carbon Dioxide ($CO_2$) capture solvents, the vacuum solvent reclamation system comprising: a feed product exchanger configured to increase the temperature of Carbon Dioxide ($CO_2$) capture solvents; a reboiler configured to further increase the temperature of Carbon Dioxide ($CO_2$) capture solvents emitted from the feed product exchanger such that the Heat Stable Salts, degradation products and other contaminants accumulate in the reboiler; the feed product exchanger and the reboiler in fluid communication to permit batch or semi-batch removal of Heat Stable Salts, degradation products and other contaminants from the Carbon Dioxide ($CO_2$) capture solvents; and, a condenser for decreasing the temperature of cleaned Carbon Dioxide ($CO_2$) capture solvents emitted from the feed product exchanger.

In another aspect of the present invention, there is provided a vacuum solvent reclamation system for removing Heat Stable Salts, degradation products and other contaminants from Carbon Dioxide ($CO_2$) capture solvents, the vacuum solvent reclamation system comprising a reboiler configured to increase the temperature of Carbon Dioxide ($CO_2$) capture solvents drawn from the stripper reboiler, such that the Heat Stable Salts, degradation products and other contaminants accumulate in the reboiler. The reboiler configured to permit batch or semi-batch removal of Heat Stable Salts, degradation products and other contaminants from the Carbon Dioxide ($CO_2$) capture solvents. The reboiler is in communication with a condenser for decreasing the temperature of cleaned Carbon Dioxide ($CO_2$) capture solvents emitted from the reboiler. Advantageously, the reboiler and condenser may be in direct communication.

Preferably, wherein the vacuum solvent reclamation system is in fluid communication with a system as described in any one of paragraphs [0033] to [0049].

In another aspect of the present invention, there is provided a process of capturing Carbon Dioxide ($CO_2$) from flue gases, the process comprising the steps of:
  providing a carbon capture solvent;
  introducing the carbon capture solvent into a Rotary Packed Bed (RPB) absorber and a Rotary Packed Bed (RPB) stripper; and, optionally, an $O_2$ eliminator;
  applying steam to a reboiler;
  bringing the carbon capture solvent in the Rotary Packed Bed (RPB) stripper to a desired pressure;
  pumping the carbon capture solvent around the Rotary Packed Bed (RPB) absorber and the Rotary Packed Bed (RPB) stripper;
  introducing flue gas into the Rotary Packed Bed (RPB) absorber;
  monitoring production of Carbon Dioxide ($CO_2$) from the Rotary Packed Bed (RPB) stripper;
  starting a Rotary Packed Bed (RPB) $O_2$ eliminator; or, a static packed bed $O_2$ eliminator;
  stopping the flow of flue gas to the Rotary Packed Bed (RPB) absorber;
  monitoring production of Carbon Dioxide ($CO_2$) from the Rotary Packed Bed (RPB) stripper until Carbon Dioxide ($CO_2$) production has stopped;
  stopping supply of steam to the reboiler;
  stopping circulation of the solvent;
  stopping rotation of the Rotary Packed Bed (RPB) stripper, absorber, water wash, acid wash and $O_2$ eliminator.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 2:
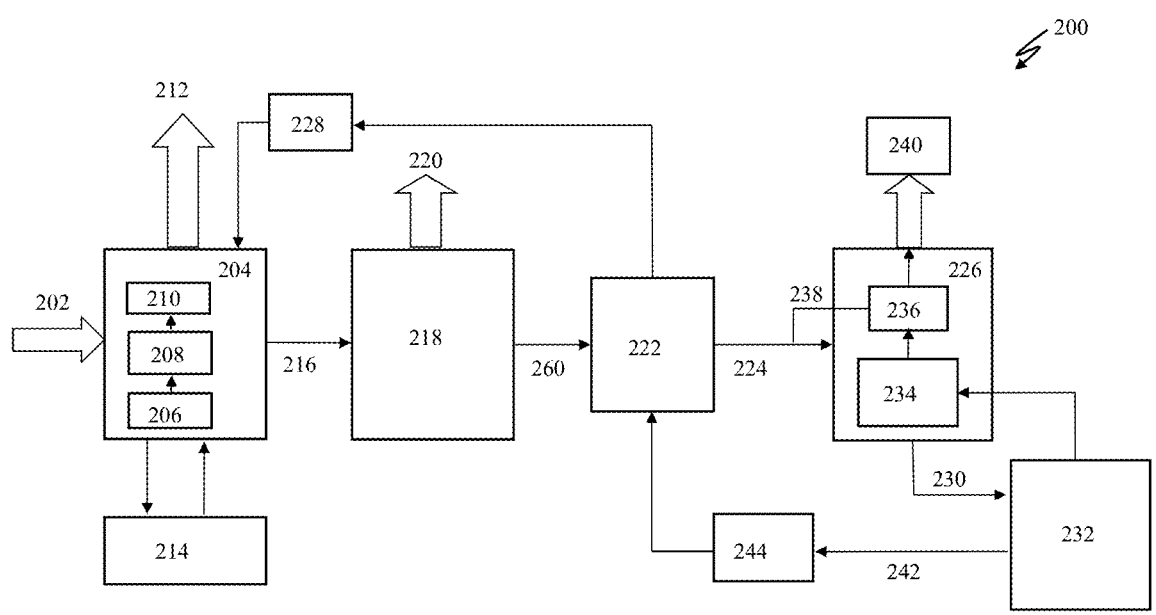
FIG. 2 illustrates a block diagram 200 of a system for capturing Carbon Dioxide ($CO_2$) from flue gases, according to an embodiment.

FIG. 2 illustrates a block diagram 200 of a system for capturing Carbon Dioxide ($CO_2$) from flue gases. At first, flue gas 202 may be fed into a Rotary Packed Bed (RPB) absorber 204. A solvent may be fed through an inner radius of the RPB absorber 204. In the RPB absorber 204, packing may be housed in a rotatable disk. The rotatable disk could be rotated at high speed to generate centrifugal force. The centrifugal force may be exerted upon the solvent when distributed onto the packing. Upon application of the centrifugal force, the solvent may move radially from the inner radius of the RPB absorber 204 towards an outer radius of the RPB absorber 204. The solvent may thus contact with the flue gas 202 comprising $CO_2$, in a cross or counter-current configuration. Such rotation of the RPB absorber 204 increases mixing between the flue gas 202 and the solvent, leading to improved mass transfer of $CO_2$ present in the flue gas 202 to the solvent present in the liquid phase.

Once the $CO_2$ is absorbed into the solvent, remaining flue gas may be cleaned in one or more water wash units 206 and 208, and/or one or more acid wash units 210. In one case, packed water wash sections can be replaced with other RPB absorbers. Wash water may be fed from an inner radius of other RPB absorber and may flow radially across the packing to an outer radius of the other RPB absorber, under centrifugal force generated by rotating motion. $CO_2$ depleted flue gas may be introduced from the outer radius of the other RPB absorber and may flow towards the inner radius of the other RPB absorber, thereby ensuring a counter-current contact between the wash water and the $CO_2$ depleted flue gas. A similar process could be applied to provide an acid wash by substituting water wash media for an appropriately concentrated solution of acidic media. Cleaned flue gas 212 obtained upon washing may be vented to atmosphere.

In one embodiment, multiple RPB absorbers, i.e., a first RPB absorber and a second RPB absorber, may be used in place of the RPB absorber 204. The first RPB absorber and the second RPB absorber may have a smaller radius and may be arranged in series on a common shaft for removing the $CO_2$ present in the flue gas 202. The flue gas 202, a portion of whose $CO_2$ has been removed in a first RPB absorber, is allowed to flow from an outlet of the first RPB absorber to an inlet of a second RPB absorber. Inside the second RPB absorber, the flue gas 202 may be contacted cross or counter-currently with a lean solvent from the stripper. The flue gas 202 obtained from the second RPB absorber may be depleted of $CO_2$ and may be sent for a water wash before being emitted to the atmosphere. A rich solvent from the first RPB absorber may be sent to the stripper for regeneration.

In one embodiment, the solvent leaving the second RPB absorber and entering the first RPB absorber may be cooled in a heat exchanger 214 as the solvent passes from the second RPB absorber to the first RPB absorber. A solvent rich in $CO_2$ 216, exiting the RPB absorber 204, may be sent to an RPB oxygen eliminator 218. The flue gas 202 present inside the RPB absorber 204 may contain oxygen ($O_2$) which can react with the solvent to form degradation products. This results in a requirement to remove and replace the degradation products formed from the solvent. Since the size of the RPB absorber 204 and RPB stripper 226 is much smaller than a static absorber and stripper, the residence time of the solvent and gas are much shorter. Therefore, for each cycle of the process, degradation of the solvent occurs at a much lower rate.

In one embodiment, a portion of the oxygen ($O_2$) present in the flue gas 202 may get absorbed into the solvent present inside the RPB absorber 204. Such absorption of the $O_2$ is undesirable for many reasons including oxidative degradation of the solvent and $O_2$ contamination of product $CO_2$. The dissolved $O_2$ may be removed from the rich solvent using the RPB $O_2$ eliminator; or, a static packed bed $O_2$ eliminator; 218. In this unit operation, $O_2$ is stripped from the rich solvent by contacting a small slipstream of product $CO_2$ gas from the rich solvent stripper counter-current to the solvent. Since the partial pressure of $O_2$ in the product $CO_2$ is low, dissolved liquid $O_2$ present in the solvent may get transferred from the liquid solvent to the gaseous phase. A stream containing the dissolved $O_2$ in gaseous form 220 may be emitted from a top of the RPB $O_2$ eliminator 218; or, fed back to the RPB absorber 204.

The rich solvent, when it exits the RPB absorber 204, may have from 5 to 10 mg/L of oxygen dissolved in it; or, from 10 to 15 mg/L of oxygen dissolved in it. This oxygen causes degradation of the solvent in the heat exchanger 222 and RPB stripper 226. Thus, stripping $O_2$ from rich solvent as it exits the absorber is desired. The rich solvent flow is 12,500 lb./h or 25 gpm. The Henry's constant of $O_2$ at 50° C. is ~20,000 atm/mole fraction. It is estimated that for 95% removal of $O_2$, a $CO_2$ flow of 15 lb./hr is required. The oxygen removed would be ~0.1 lb./hr. carried away by 15 lb./hr. of $CO_2$.

In one embodiment, the solvent may enter the RPB $O_2$ eliminator 218 from a center of a packed bed which is rotating. The solvent may be pushed from the center of the rotating packed bed to the outer radius due to centrifugal forces, as described above. While the solvent leaves an edge of the packing bed, the solvent strikes a wall of the casing of the packing bed and then drains into a sump. A small portion of stripping $CO_2$ 240 may be fed through a penetration in the wall of the casing and passes under pressure, counter currently, from the radius of the packed bed to the center of the packed bed. A penetration may be present at the center of the packed bed. The penetration may allow the gas to leave the RPB $O_2$ eliminator 218. Rotation of the packed bed may cause vigorous mixing of the solvent with the stripping gas. A $CO_2$ rich solvent 260 may then exit the RPB $O_2$ eliminator 218 and may pass to a solvent heat exchanger 222.

In another embodiment, the $CO_2$ rich solvent may enter the conventional (static) packed bed $O_2$ eliminator 218 from the top of a packed bed column. A small portion of stripping $CO_2$ 240 may be fed from the bottom of the packed bed column. The stripping $CO_2$ 240 may make counter-current gas-liquid contact. A penetration may be present at the center of the packed bed. The penetration may allow the gas to leave the conventional packed bed $O_2$ eliminator 218. A $CO_2$ rich solvent 260 may then exit the conventional (static) packed bed $O_2$ eliminator 218 and may pass to a solvent heat exchanger 222.

Once the $CO_2$ rich solvent 260 is heated in the solvent heat exchanger 222 by the $CO_2$ lean solvent 242, a $CO_2$ rich solvent present at high temperature 224 may be provided to an RPB stripper 226 and a reclaimed solvent 228 may be fed back to the RPB absorber 204. The $CO_2$ rich solvent present at high temperature 224 may be fed into the RPB stripper 226 through an inner radius of the RPB. The RPB stripper 226 may be rotated to generate a centrifugal force exerted upon the $CO_2$ rich solvent present at high temperature 224 when distributed onto the packing. Due to the centrifugal force, the $CO_2$ rich solvent present at high temperature 224 may move radially from the inner radius of the packing towards the outer radius of the RPB. While the $CO_2$ rich solvent present at high temperature 224 moves from the inner radius to the outer radius, there may be a high degree of turbulent mixing and droplet formation which may increase the effective surface area for mass transfer. At the outer radius of the RPB, the $CO_2$ rich solvent present at high temperature 224 may be ejected and accumulated in a solvent sump via the internal wall of RPB stripper casing.

In one embodiment, solvent 230 accumulated in the solvent sump may be transferred to a reboiler 232. The solvent 230 may be heated in the reboiler 232. A temperature inside the reboiler 232 may be set to vaporize water present in the solvent 230. The water may be vaporized at an operating pressure of the RPB stripper 226. Steam formed in the reboiler 232 may be introduced to the outer radius of the RPB stripper 226.

In one embodiment, a take-off point may be present at the inner radius of the RPB stripper 226 for receiving the steam and the $CO_2$ out of the RPB stripper 226. The steam and the $CO_2$ may be transferred to a condenser 234. Inside the condenser 234, the steam present with the $CO_2$ may be condensed into a condensate 238, i.e., water. The water upon condensation may be separated from the $CO_2$ in a reflux vessel 236. Condensation of the steam in the condenser 234 may cause a pressure drop to be induced across the stripper packing. Such pressure drop may provide a driving force for the water and the $CO_2$ to leave the RPB stripper 226. The $CO_2$ may be directed to a down-stream unit 240 for downstream processing.

In one embodiment, the condensate 238 may be mixed with the $CO_2$ rich solvent present at high temperature 224 before the condensate 238 enters the RPB stripper 226 via the inner radius of the packed bed. A $CO_2$ lean solvent 242 produced in the reboiler 232 may be returned to the process through the solvent heat exchanger 222.

Figure 3A:
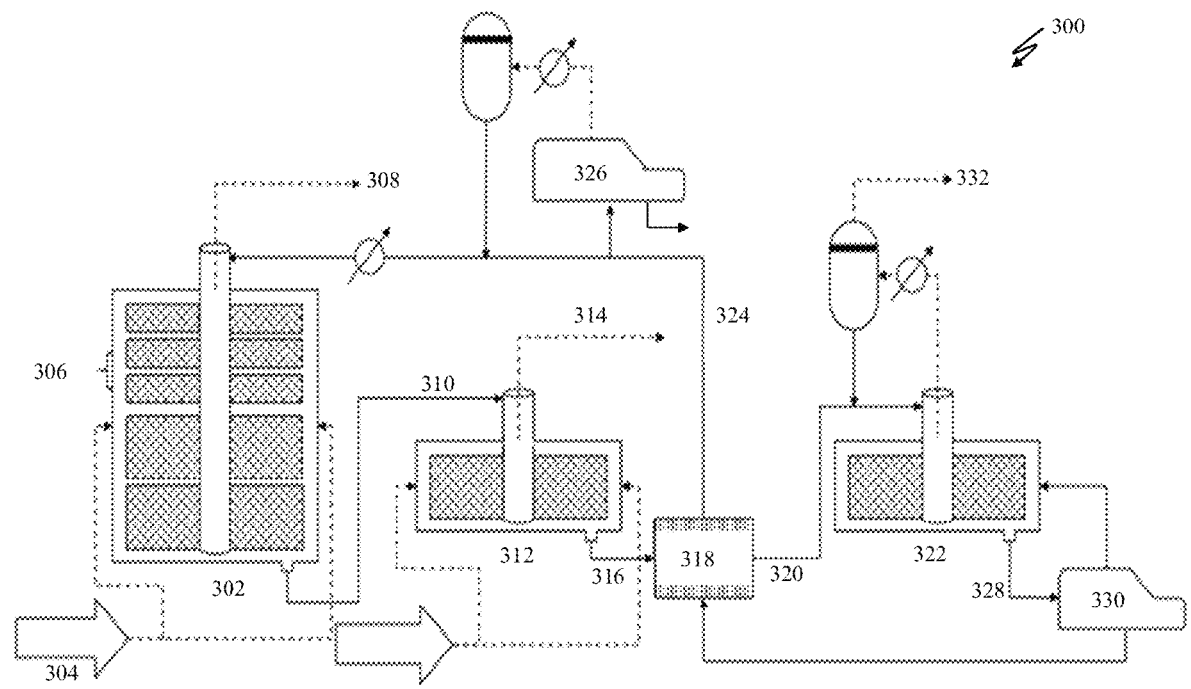
FIG. 3A illustrates a block diagram 300 illustrating functioning of a Rotary Packed Bed (RPB) absorber 302 in a system for capturing Carbon Dioxide ($CO_2$) from flue gases, according to another embodiment.

FIG. 3A illustrate a block diagram 300 showing functioning of a Rotary Packed Bed (RPB) absorber 302 in a system for capturing Carbon Dioxide ($CO_2$) from flue gases. At first, flue gas 304 may be fed to the RPB absorber 302 and may be reacted with a solvent. The RPB absorber 302, placed on a rotatable disk, rotates and thus centrifugal force acts upon the RPB absorber 302. The solvent may thus contact the flue gas 302 comprising $CO_2$ in a cross or counter-current configuration. Once the $CO_2$ is absorbed into the solvent, remaining flue gas may be cleaned using water wash and/or acid wash.

In one embodiment, wash water may be fed through an inner radius 306 of the RPB absorber 302. The wash water may thus flow radially, across a packing of the RPB absorber 302, to an outer radius of the RPB absorber 302, under the action of the centrifugal force. During the water wash, $CO_2$ depleted flue gas to be processed may be introduced from the outer radius of the RPB absorber 302 and may flow towards the inner radius 306, thereby ensuring a counter-current contact between the wash water and the $CO_2$ depleted flue gas. Similarly, a concentrated solution of acidic media may be used for providing the acid wash to the $CO_2$ depleted flue gas. Successive to the water wash and the acid wash, cleaned $CO_2$ depleted flue gas 308 may be vented.

In one embodiment, multiple RPB absorbers, i.e., a first RPB absorber and a second RPB absorber, may be used in place of the RPB absorber 302. The first RPB absorber and the second RPB absorber may have a smaller radius and may be arranged in series on a common shaft for removing the $CO_2$ present in the flue gas 304 The flue gas 304 a portion of whose $CO_2$ has been removed in a first RPB absorber, is allowed to flow from an outlet of the first RPB absorber to an inlet of a second RPB absorber. Inside the second RPB absorber, the flue gas 304 may be contacted cross or counter-currently with a lean solvent from the stripper. The flue gas 304 obtained from the second RPB absorber may be depleted of $CO_2$ and may be sent for water wash before being emitted to the atmosphere. A rich solvent from the first RPB absorber may be sent to the stripper for regeneration.

In one embodiment, solvent rich in $CO_2$ 310, exiting the RPB absorber 302, may be sent to an RPB $O_2$ eliminator 312. A portion of oxygen ($O_2$) present in the flue gas 304 may get absorbed into the solvent present inside the RPB absorber 302 Such absorption of the oxygen ($O_2$) is undesirable for reasons stated above. The oxygen ($O_2$) may be removed from the rich solvent using the RPB $O_2$ eliminator 312. Since the partial pressure of $O_2$ in the product $CO_2$ is low, liquid dissolved $O_2$ present in the solvent may get transferred to a gaseous phase. A stream 314 may be emitted from a top of the RPB $O_2$ eliminator 312. Successively, a $CO_2$ rich solvent 316 may then exit the RPB deaerator 312 and may be provided to a solvent heat exchanger 318.

Once the $CO_2$ rich solvent 316 is heated in the solvent heat exchanger 318 by the $CO_2$ lean solvent 350, a $CO_2$ rich solvent present at high temperature 320 may be provided to an RPB stripper 322. A cooled $CO_2$ lean solvent 324 to the RPB absorber 302 upon processing. The $CO_2$ rich solvent present at high temperature 320 may be fed into the RPB stripper 322. The RPB stripper 322 may be rotated to generate a centrifugal force exerted upon the $CO_2$ rich solvent present at high temperature 320 when distributed onto the packing. Due to the centrifugal force acting upon the RPB stripper 322, the $CO_2$ rich solvent present at high temperature 320 may be ejected and accumulated in a solvent sump via the internal wall of RPB stripper casing.

In one embodiment, solvent 328 accumulated in the solvent sump may be transferred to a reboiler 330. The solvent 328 may be heated in the reboiler 330. Steam formed in the reboiler 330 may be introduced to an outer radius of the RPB stripper 322. A take-off point may be present at an inner radius of the RPB stripper 322 for receiving the steam and $CO_2$ out of the RPB stripper 322. The steam and the $CO_2$ may be transferred to a condenser for condensing the steam present with the $CO_2$ into a condensate. The water upon condensation may be separated from the $CO_2$. Condensation of the steam in the condenser may cause a pressure drop to be induced across the stripper packing. Such pressure drop may provide a driving force for the water and the $CO_2$ to leave the RPB stripper 322. The $CO_2$ 332 separated from the water may be directed for down-stream processing with a small portion of the $CO_2$ 332 may be fed into $O_2$ eliminator 312.

In one embodiment, the cooled $CO_2$ lean solvent 324 may pass to the RPB absorber 302 via a thermal reclaimer 326.

Figure 3B:
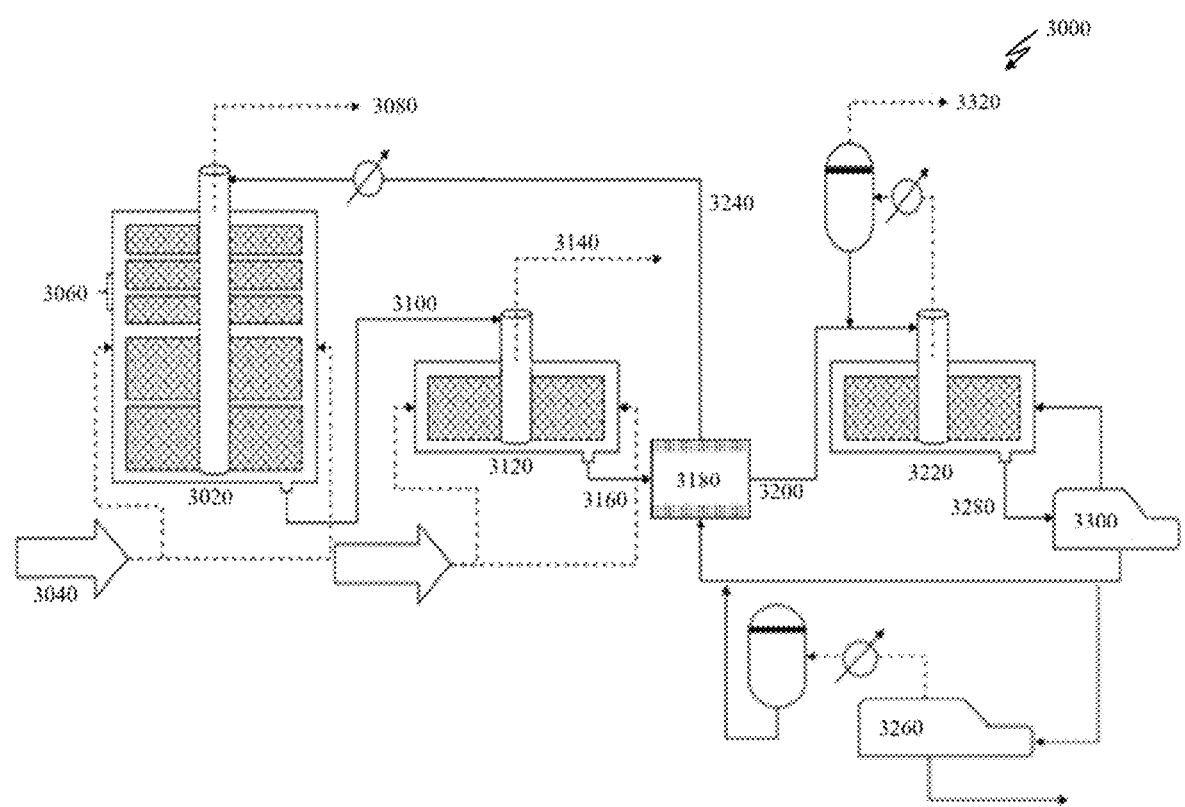
FIG. 3B illustrates a block diagram 3000 illustrating functioning of a Rotary Packed Bed (RPB) absorber 3020 in a system for capturing Carbon Dioxide ($CO_2$) from flue gases.

FIG. 3B illustrate a block diagram 3000 showing functioning of a Rotary Packed Bed (RPB) absorber 3020 in a system for capturing Carbon Dioxide ($CO_2$) from flue gases In one embodiment, as an alternative to the configuration of FIG. 3A, the thermal reclaimer 3260 may be positioned on a connecting point between the stripper reboiler 3300 and the solvent heat exchanger 3180. In one embodiment, the solvent heat exchanger 3180 and RPB absorber 3020 are in direct communication. The other components of the block diagram 3000 correspond to the components of the FIG. 3A with a "0" added at the end of the respective reference number, e.g. 312 in FIG. 3A is 3120 in FIG. 3B etc.

Figure 4A:
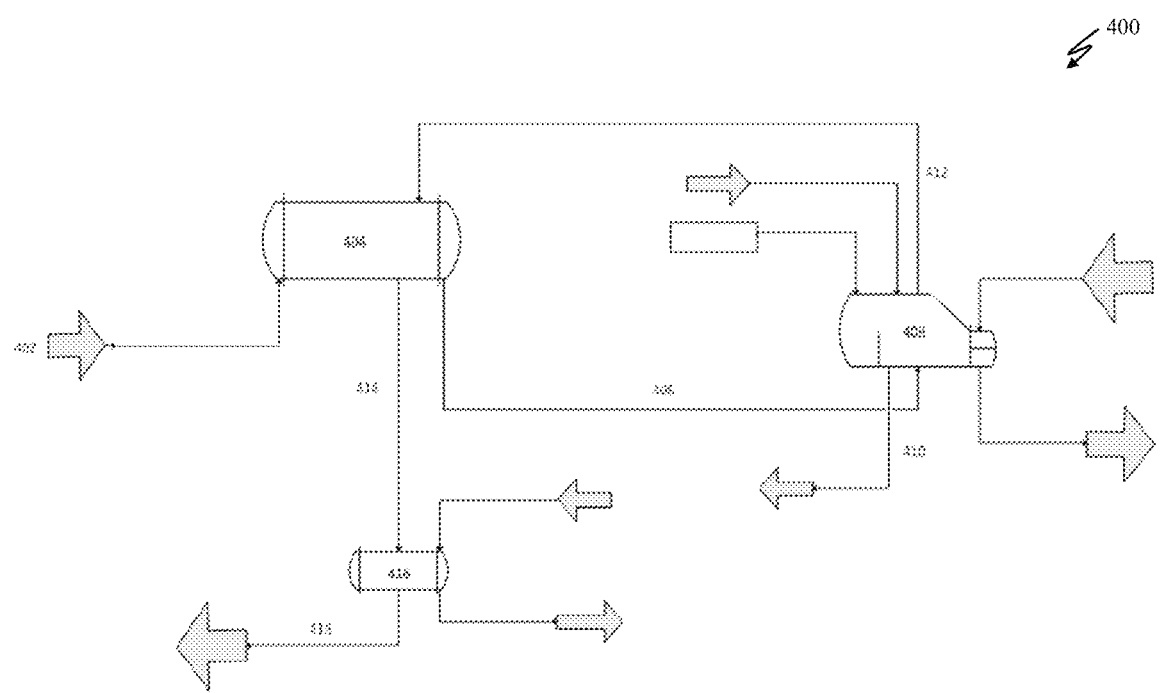
FIG. 4A illustrates a block diagram 400 representation of a vacuum solvent reclamation system, according to an embodiment.

In one embodiment, Lean Solvent 402 from lean solvent cooler outlet may be taken into a vacuum solvent reclamation system, as shown in block diagram 400 of FIG. 4A. The thermal vacuum solvent reclamation system may be operated to remove Heat Stable Salts (HSS), degradation products, and other contaminants from the solvent while the concentrations are more than 2 wt. %. The vacuum solvent reclamation system may include an input of the lean solvent 402 fed to a feed product exchanger 404. The feed product exchanger 404 increases temperature of the mixture from 40° C. to 165° C. by heating with vapors 412 from Reboiler 408.

The lean solvent 406 from the feed product exchanger 404 may then be passed to a reboiler 408. The reboiler 408 may cycle thermic fluid in and out and may increase the temperature of the solvent from 165° C. to 180° C. Sodium Hydroxide may be added in Reboiler 408 to liberate carbon capture solvent from heat stable salts and degradation products. In an embodiment, Residue 410 at the end of operation may be sent to an incinerator for disposal. Vapor components 412 of the mixture via the feed product exchanger 404 may be provided to a condenser 416. The vapor components 412 may be condensed into a liquid 418 before being sent to an absorber. The thermal reclaiming system may be operated in semi-batch mode allowing the HSS and impurities to accumulate in the reboiler 408. After the batch completion, water may be added in Reboiler 408 when the liquid level is low in order to facilitate the withdrawal of residue 410.

Figure 4B:
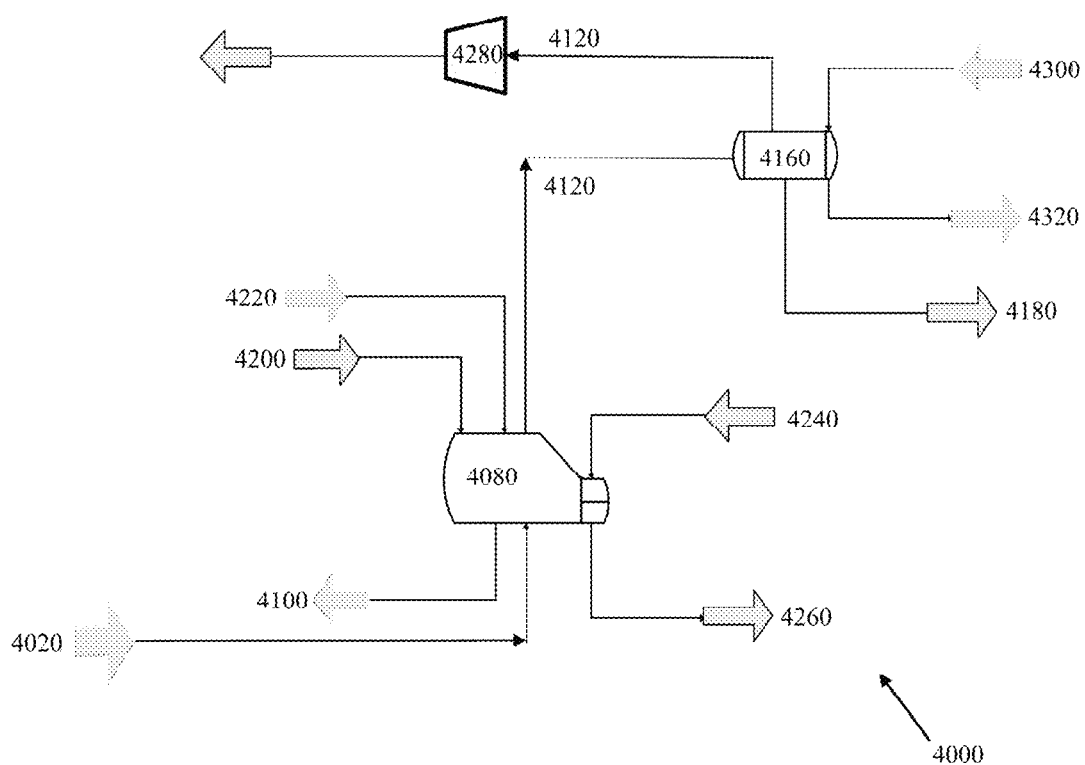
FIG. 4B illustrates a block diagram 4000 representation of a vacuum solvent reclamation system, according to an embodiment.

In another embodiment, Lean Solvent 4020 from a lean solvent pump discharge may be taken into a vacuum solvent reclamation system, as shown in block diagram 4000 of FIG. 4B. The temperature of the Lean Solvent 4020 may be 120° C. The thermal vacuum solvent reclamation system may be operated to remove Heat Stable Salts (HSS), degradation products, and other contaminants from the solvent while the concentrations are more than 2 wt. %. The vacuum solvent reclamation system may include an input of the lean solvent 4020 fed to a Reboiler 4080.

The reboiler 4080 may circulate thermic fluid and may increase the temperature of the solvent from 120° C. to 180° C. Sodium Hydroxide 4200 may be added in Reboiler 4080 to liberate solvent from Heat Stable Salts and degradation products. In an embodiment, demineralized water 4220 may be added in Reboiler 4080. In an embodiment, medium pressure steam 4240 may be added to Reboiler 4080 and medium pressure steam 4260 may be removed from Reboiler 4080. Residue 4100 at the end of operation may be sent to an incinerator for disposal. Vapor components 4120 of the mixture may pass to a condenser 4160. In an embodiment, cooling water 4300 may be added to condenser 4160 and cooling water 4320 may be removed from condenser 4160. The vapor components 4120 may be condensed into a liquid 4180 before being sent as treated solvent to an absorber via a heat exchanger (not shown). The vapor components 4120 may be sent to an absorber via a vacuum pump 4280. The thermal reclaiming system may be operated in semi-batch mode allowing the HSS and impurities to accumulate in the reboiler 4080. After the batch completion, water may be added in Reboiler 4080 when the liquid level is low in order to facilitate the withdrawal of residue 4100.

An inherent advantage of using RPB strippers compared to the static bed stripper columns is increased mixing in the RPB strippers that results in better mass transfers of $CO_2$ from liquid to a gaseous phase. This enables utilization of an RPB stripper of much smaller size than a conventionally used stripper. Further advantages of utilizing the system and the process for capturing Carbon Dioxide ($CO_2$) from flue gases may include: lower energy requirement to capture unit mass of $CO_2$ due to less water in solvent, smaller and lower capital cost carbon capture plant due to higher rates of mass transfer, lower solvent degradation and make-up requirement due to shorter exposure to oxygen, lower energy requirements to capture unit mass of $CO_2$ due to inter-stage cooling increasing the $CO_2$ loading into the solvent, and lower solvent degradation and make-up requirements due to more uniform temperature profile in RPB absorber, shorter solvent residence time in the RPB absorber and RPB stripper.

Further advantages of utilizing the system and the process for capturing Carbon Dioxide ($CO_2$) from flue gases may include: smaller size and hence lower capital cost for water wash and acid wash, reduced capital cost by mounting the RPB, absorber, water wash, acid wash, and stripper on a single shaft, lower capital cost of oxygen eliminator, lower formation of aerosols due to removal of temperature bulge in RPB absorber, and utilization of vacuum thermal reclaimer and hence less degradation and high recovery of the solvent.

Figure 5A:
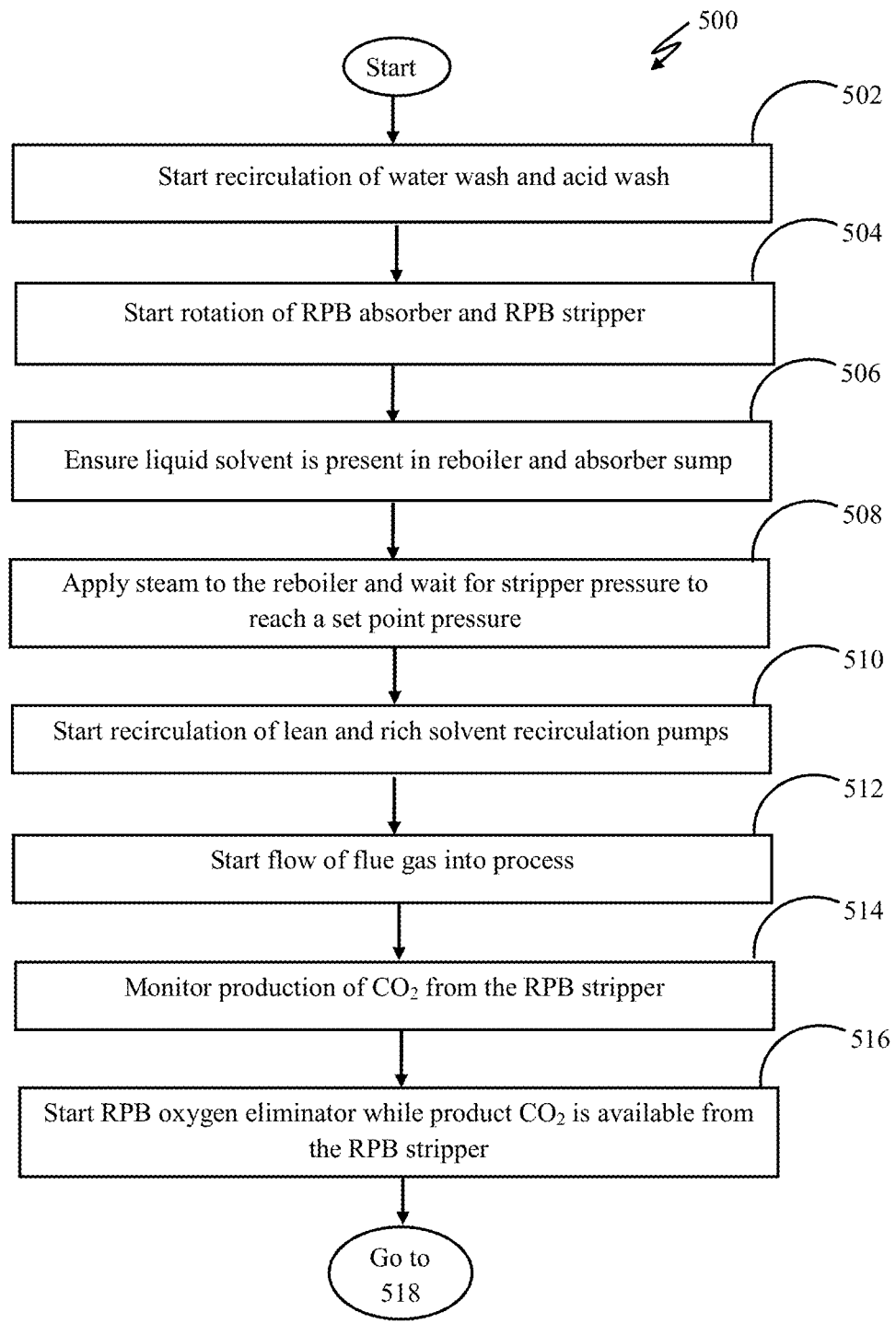
FIGS. 5A and 5B illustrate a flowchart 500 illustrating a process of capturing Carbon Dioxide ($CO_2$) from flue gases, according to an embodiment.
Figure 5B:
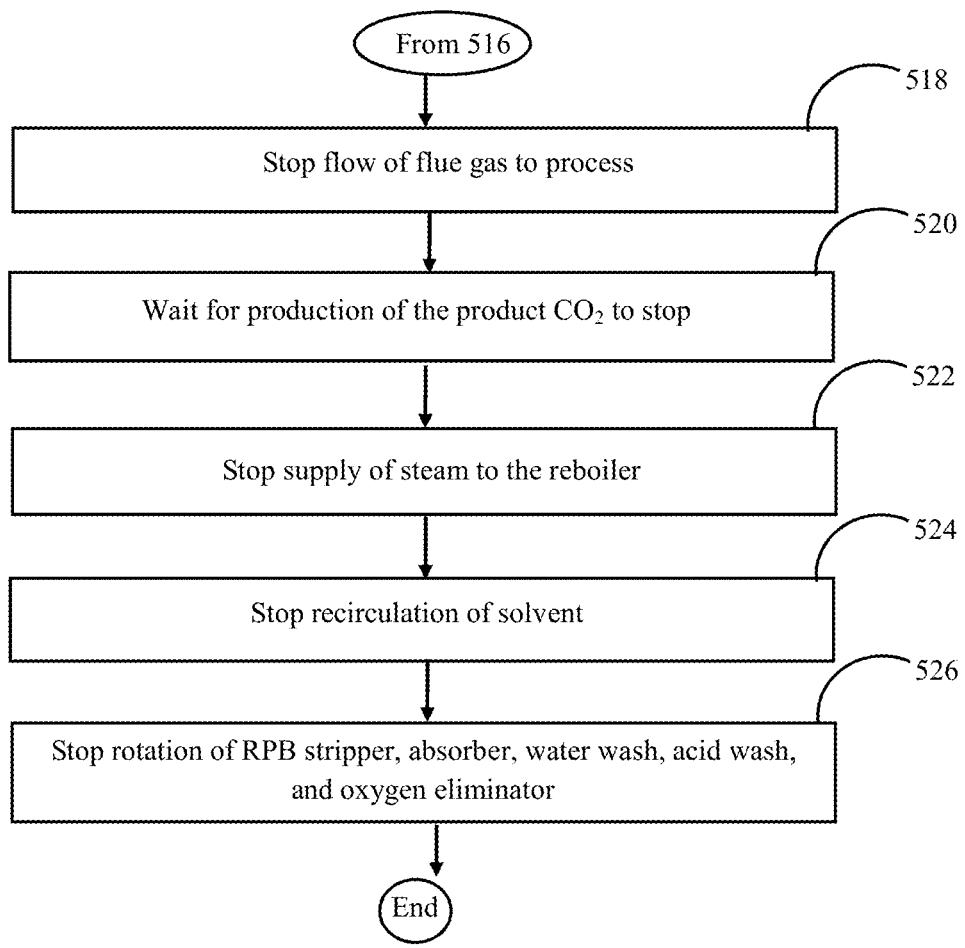

FIG. 5 illustrates a flowchart 500 of a process of capturing Carbon Dioxide ($CO_2$) from flue gases, according to an embodiment. FIG. 5 comprises a flowchart 500 that is explained in conjunction with the elements disclosed in FIGs. explained above.

The flowchart 500 of FIG. 5 shows the architecture, functionality, and operation for capturing Carbon Dioxide ($CO_2$) from flue gases. It should also be noted that in some alternative implementations, the functions noted in the blocks may occur out of the order noted in the drawings. For example, two blocks shown in succession in FIG. 5 may, in fact, be executed substantially concurrently or the blocks may sometimes be executed in the reverse order, depending upon the functionality involved. In addition, the process descriptions or blocks in flow charts should be understood as representing decisions made by a hardware structure such as a state machine. The flowchart 500 starts at step 502 and proceeds to step 526.

At step 502, recirculation of wash water and acid water may be started in the process. At step 504, rotation of an RPB absorber and an RPB stripper may be started. Further, the presence of liquid solvent in a reboiler and an absorber sump may be ensured at step 506. Steam may be applied to the reboiler and stripper pressure may be allowed to reach a set point pressure at step 508. Recirculation of lean and rich solvent recirculation pumps may be started at step 510. The flow of flue gas may be started into the process at step 512. Production of $CO_2$ from the RPB stripper may be monitored at step 514. Thereafter, RPB $O_2$ eliminator may be started while product $CO_2$ is available from the RPB stripper at step 516. The flow of the flue gas may be stopped at step 518. It may wait until production of the product $CO_2$ stops at step 520. Supply of steam to the reboiler may be stopped at step 522, and recirculation of solvent may be stopped at step 524. Finally, rotation of the RPB stripper, RPB absorber, water wash, acid wash, and $O_2$ eliminator may be stopped at step 526.

Figure 6:
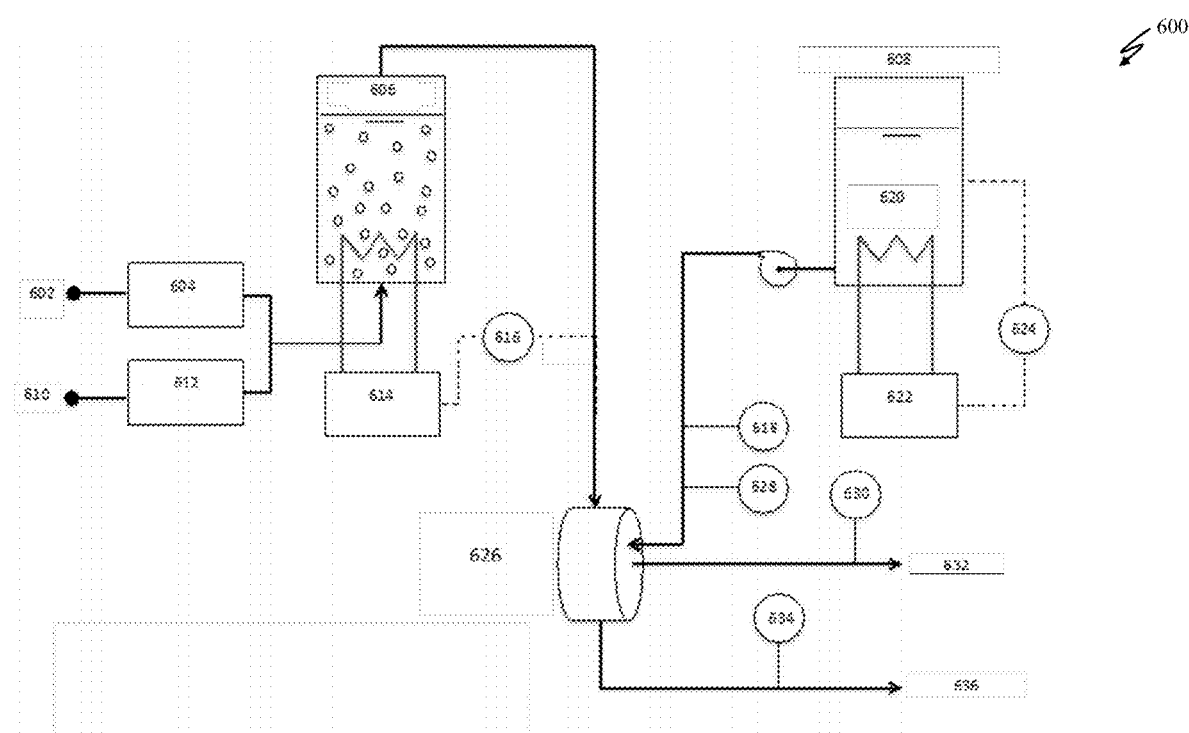
FIG. 6 illustrates a block diagram 600 representation of a Rotary Packed Bed Absorber

FIG. 6 illustrates a block diagram 600 representation of a Rotary Packed Bed Absorber test rig, according to an embodiment. The Rotary Packed Absorber test rig allows for the testing of solvents under various conditions, and allows temperature and flow to be measured at critical locations. A simulated flue gas is created by mixing $CO_2$ 602 with air 610 via mass flow controller 604 and mass flow controller 612, respectively. The simulated flue gas is fed into humidifier 606 which has a supply of hot water 614. The temperature of the simulated flue gas post humidifier 606 is measured and controlled by temperature measurement and controller 616. The simulated flue gas may then be fed into Rotary Packed Bed Absorber 626. The Rotary Packed Bed Absorber has an inner diameter of 0.08 meters and an outer diameter of 0.3 meters, providing a radial packed depth of 0.11 meters. The length of the packed bed along the axis of rotation is 0.02 meters. The Rotary Packed Bed Absorber 626 is housed in a poly propylene case with an internal diameter of 0.36 meters. The Rotary Packed Bed Absorber 626 is driven by a synchronous electric motor with a maximum speed of 3000 rpm.

Rotary Packed Bed Absorber 626 is fed solvent from amine feed tank 608, where the solvent is heated by hot water system 622 at location 620 of the amine feed tank 608 using circulated hot water. The flow of the solvent from amine feed tank 608 is measured at flow measurement 618 and the temperature of the solvent from amine feed tank 608 is measured at temperature measurement 628. The temperature of the gas out 632 from the Rotary Packed Bed absorber 626 is measured by temperature measurement 630. The temperature of the amine out 636 is measured by the temperature measurement 634.

EXAMPLES

Example 1: Determining the Operating Conditions for a Range of Solvents

In this example, the operating conditions for a range of solvents were determined. Table 1 shows the operating conditions for the solvents.

$CO_2$ absorption was measured for a range of solvent flow rates and speeds of rotation. The range of the parameter settings is shown in Table 1.

TABLE 1

The range of parameter settings for a range of solvents.

| Solvent | Speed of rotation rpm | Liquid to gas ratio kg/kg |
|---|---|---|
| 30 wt. % Mono Ethanol Amine | 600-1450 | 2.8-3.7 |
| 90 wt. % Mono Ethanol Amine | 600-1150 | 0.9-1.2 |
| 43 wt. % CDRMax | 600-1150 | 1.8-2.5 |
| 55 wt. % CDRMax | 600-1450 | 1.5-2.4 |
| 43 wt. % CDRMax second pass | 600-1150 | 1.8-2.5 |

For each test the inlet $CO_2$ 602 was constant at 12 mol. %, which is a similar concentration to coal flue gas, and the temperature of the liquid solvent was 40° C. The liquid to gas ratio is a critical parameter for a carbon capture process, as absorbers show higher performance with an increased liquid flow rate until the absorber reaches its flooding point. An optimum flow rate may be found by considering the increased stripper duty required with increased amounts of solvent, which may be only lightly load with $CO_2$. The increased stripper duty increases the necessary energy to perform the carbon capture process. The test results shown in Table 1 allow for the calculation of the number of transfer units required ($NTU_{OG}$). From the results on 30 wt. % MEA with a speed of rotation of 600 rpm and an L/G of 3.3, the inlet $CO_2$ was 12.1% and the outlet $CO_2$ was 9.1%. Therefore, the number of transfer units required is:

$$NTU_{OG} = \ln\frac{12.1}{9.1} = 0.28$$

Further, the Packed Height is equal to the overall gas phase Height of a Transfer Unit ($HTU_{OG}$) multiplied by the Number of Overall Gas phase transfer Units (NOG). Given that the radius of the test apparatus was 0.11 m, the H=0.11 meters, and the NTU=0.28, the height of overall gas phase transfer unit is:

$$HTU_{OG} = \frac{r_o - r_i}{NTU_{OG}} = \frac{0.11}{0.28} = 0.39 \text{ m}$$

The height of a gas transfer unit was found to be 0.39 meters. This shows a significant reduction in size of a gas phase transfer unit for a Rotary Packed Bed absorber compared to a static bed absorber. Table 2 shows the test results from five solvent trails, according to an embodiment.

TABLE 2

Test results from five solvent trials.

| Solvent | | 30 wt. % MEA | 90 wt. % MEA | 43 wt % CDRMax Solvent | 43 wt % CDRMax Solvent Second pass | 55 wt % CDRMax |
|---|---|---|---|---|---|---|
| L/G (Liquid flow rate to gas flow rate ratio) | | 3.30 | 1.10 | 2.20 | 2.20 | 1.90 |
| NTU | | 0.28 | 0.71 | 0.35 | 0.27 | 0.51 |
| HTU | | 0.39 | 0.15 | 0.32 | 0.40 | 0.22 |
| Area of TU/m² | | 0.23 | 0.09 | 0.19 | 0.24 | 0.13 |
| NTU required | | 2.30 | 2.30 | 2.30 | 0.23 | 2.30 |
| Scale factor for 90% removal | | 8.22 | 3.24 | 6.58 | 8.53 | 4.51 |
| Method 1 - radius basis | Radius Required/m | 0.90 | 0.36 | 0.72 | 0.94 | 0.50 |
| Method 2 - area basis | Area Required/m² | 1.93 | 0.30 | 1.23 | 2.07 | 0.58 |
| | Ro/m | 0.82 | 0.35 | 0.67 | 0.85 | 0.47 |
| | Ri/m | 0.04 | 0.04 | 0.04 | 0.04 | 0.04 |
| | Ro – Ri/m | 0.78 | 0.31 | 0.63 | 0.81 | 0.43 |

MEA = Mono Ethanol Amine,
TU = transfer units,
NTU = number of transfer units

For each solvent a range of liquid to gas ratio and speed of rotation were tested. The testing provides a method for determining the size of rotary packed bed absorber required for a 90% $CO_2$ capture at 600 rpm.

Example 2: Determining Operating Parameters Required to Maximize Recovery of Solvents by Simulating the Vacuum Thermal Reclaimer In this example, Table 3 illustrates the experimental results of a vacuum thermal reclaimer system. A sample of solvent from an operating $CO_2$ capture plant was reclaimed in an experimental setup. The recoveries achieved are shown in Table 3. Furthermore, simulations were performed for sensitivity analysis and optimize the operating parameters to maximize the recovery and minimize the energy requirement.

TABLE 3

Experimental results of a vacuum thermal reclaimer system.

Vacuum Thermal Reclaimer Experimental Results

| Parameters | UOM | Inlet Solvent | Recovered Solvent | Residue | Recovery |
|---|---|---|---|---|---|
| Total Sample | wt % | 100 | 98.1 | 1.9 | 98.1% |
| CDRMax | wt % | 99.4 | 98.1 | 1.3 | 98.6% |
| Heat Stable Salts | wt % | 0.6 | 0.0 | 0.6 | 0.0% |

UOM = unit of measurement

In this example, the operating parameters required to maximize the recovery of the solvent CDRMax was determined using a vacuum thermal reclaimer simulation. Table 4 illustrates a table showing the Vacuum Thermal Reclaimer Simulation Results, according to an embodiment. The optimum case results at a temperature of 165° C. and 0.75 bar(a) are tabulated in the table illustrated by Table 4.

TABLE 4

The vacuum thermal reclaimer simulation results.

| Parameters | UOM | Inlet Solvent | Recovered Solvent | Residue | Recovery, % |
|---|---|---|---|---|---|
| Total Flow | kg/hr | 5235.9 | 4935.2 | 143.8 | 94.3% |
| $CO_2$ | kg/hr | 157 | 157 | 0 | 100% |

TABLE 4-continued

The vacuum thermal reclaimer simulation results.

| Parameters | UOM | Inlet Solvent | Recovered Solvent | Residue | Recovery, % |
|---|---|---|---|---|---|
| CDRMax | kg/hr | 4999.7 | 4935.2 | 64.6 | 98.7% |
| Heat Stable Salts | kg/hr | 79.2 | 0 | 79.2 | 0.0% |

UOM = Unit of measurement

Example 3: The Relationship of $CO_2$ in the Vapor Phase and the Loading (i.e. Concentration) of $CO_2$ in a Solvent at 40° C.

Figure 7:
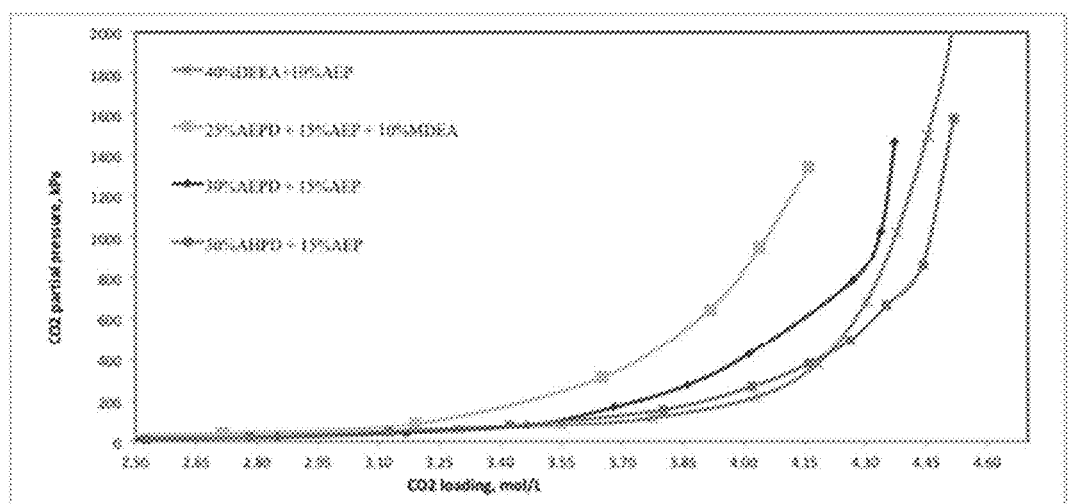
FIG. 7 illustrates a graph showing vapor liquid equilibrium (VLE) relationship between partial pressure of $CO_2$ in the vapor phase and the loading (i.e. concentration) of $CO_2$ in a solvent at 40 C.

In this example, the relationship between $CO_2$ in the vapor phase and the loading (i.e. concentration) of $CO_2$ in a solvent at 40° C. was determined. FIG. 7 illustrates a graph showing vapor liquid equilibrium (VLE) relationship between partial pressure of $CO_2$ in the vapor phase and the loading (i.e. concentration) of $CO_2$ in a solvent at 40° C.

Example 4: Viscosity of Unloaded $CO_2$ Solvent and Loaded $CO_2$ Solvent

In this example, the viscosity of an unloaded $CO_2$ solvent and loaded $CO_2$ solvent was determined. Table 5 shows unloaded (no $CO_2$) solvent viscosity and $CO_2$ loaded solvent viscosity at 40° C.

TABLE 5

The viscosity of $CO_2$ loaded and unloaded (no $CO_2$) solvents.

| | Unloaded | $CO_2$ loaded Viscosity, cP @40 C. | |
|---|---|---|---|
| Solvent | Viscosity, cP @40 C. | $CO_2$ loading, mol/L | Viscosity, cP |
| 40% DEEA + 10% AEP | 4.472 | 2.000 | 12.59 |
| 10% AHPD + 10% AEP | 1.370 | 0.597 | 1.78 |
| 10% AEPD + 10% AEP | 1.470 | 0.658 | 1.86 |
| 30% AEPD + 15% AEP | 3.759 | 2.020 | 8.77 |
| 30% AHPD + 15% AEP | 4.004 | 2.050 | 10.62 |

In Table 5, the components are given in weight %. The balance in each case is demineralised water.
DEEA=2-(diethylamino)ethanol
AHPD=2-amino-2-hydroxymethyl-1,3-propanediol
AEPD=2-amino-2-ethyl-1,3-propanediol
AEP=2-piperazine-1-ethylamine Example 5: Methodology of Sizing for RPB Scale Up In this example, a design of a RPB that allows for a target of 10 tons of $CO_2$ capture per day from a "coal style" flue gas that contains 10 vol. % $CO_2$ at a capture rate of 90% was determined.

In this example, using empirical relationships, the inner diameter ($d_i$), outer radius ($r_o$), inner radius ($r_i$) and axial length (z) of an RPB are determined. The parameters are then used to determine the cross-sectional area and total volume of the RPB required.

In this example, the inner diameter ($d_i$) of the RPB was sized to include room for the liquid distribution mechanism, whilst avoiding liquid entrainment and excessive gas velocities during operation of the RPB.

In this example, the axial length (z) was determined to give the minimum permissible sizing whilst allowing sufficient packing volume for the required amount of mass transfer to take place without incurring flooding.

In conventional static systems the Height of the packing (H) required for the specified degree of mass transfer is determined by the following expression. Where the Height of the packing (H) is the product of the overall gas phase Height of a Transfer Unit ($HTU_{OG}$) and the Number of Transfer Units for the gas phase ($NTU_{OG}$):

$$H = NTU_{OG} HTU_{OG}$$

In RPB applications the packing requirements differ from conventional static columns, as they are not linear with respect to height of the packing. Instead, an analogy is used where the cross-sectional area of the packing ($\pi(r_o^2 - r_i^2)$) is equivalent to Height of the packing (H) in a conventional system. This is expressed in relation to the overall gas phase Area of a Transfer Unit ($ATU_{OG}$) and the overall Number of Transfer Units for the gas phase ($NTU_{OG}$) in the following equation:

$$\pi(r_o^2 - r_i^2) = NTU_{OG} ATU_{OG}$$

To determine the cross-sectional area of the packing (($\pi(r_o^2 - r_i^2)$), both $NTU_{OG}$ and $ATU_{OG}$ must be known and can be derived experimentally using the following expressions, where $y_{in}$ is the inlet mole fraction of the component to be absorbed; $y_{out}$ is the outlet mole fraction of the component to be absorbed; $Q_G$ is the volumetric gas flow; z is the axial length of the RPB and $K_G a$ is the gas phase mass transfer coefficient:

$$NTU_{OG} = \ln\left|\frac{y_{in}}{y_{out}}\right|$$

$$ATU_{OG} = \frac{Q_G}{z K_G a}$$

In this example, the solvent trials were carried out with a prototype RPB absorber. A lean solvent with a $CO_2$ concentration of 0.1 mole of $CO_2$ per mole of solvent alkalinity was used to simulate the expected conditions in a real $CO_2$ capture plant. This resulted in gas phase mass transfer coefficients that were measured in conditions representative of an operational $CO_2$ capture plant.

In the solvent trials for this example, the gas phase mass transfer coefficients had to be calculated. The cross-sectional area, axial length, volumetric gas flow were already known, and the inlet mole fraction of $CO_2$ in the gas ($y_{in}$) and outlet mole fraction of $CO_2$ in the gas ($y_{out}$) were both measured.

In this example, by using the $K_G a$ value for a solvent of interest allows the scaling of the radial depth to achieve 90% $CO_2$ capture from a 10 vol. % $CO_2$ flue gas.

Example 6: Size of RPB to Capture 1 Ton Per Day CO$_2$

In this example, the size of a RPB that allows for a target of 1 ton of CO$_2$ capture per day from a flue gas.

TABLE 6

Size parameters of a RPB that captures 1 ton of CO$_2$ per day from a flue gas that contains 10 vol. % CO$_2$ at a capture rate of 90%.

| Technology Vessel | RBP | | |
|---|---|---|---|
| | Radius m | Axial Length m | Volume m$^3$ |
| RPB Absorber | 0.574 | 0.064 | 0.033 |
| RPB Stripper | 0.144 | 0.024 | 0.002 |

Table 6 shows that the dimensions of the RPB absorber and stripper are all less than one meter. The RPB absorber and stripper are relatively small and compact.

Example 7: Design of RPB to Capture 10 Tons of CO$_2$ Per Day

In this example, the design of a RPB that allows for a target of 10 tons of CO$_2$ capture per day from a flue gas that contains 10 vol. % CO$_2$ at a capture rate of 90% was determined.

Figure 8:
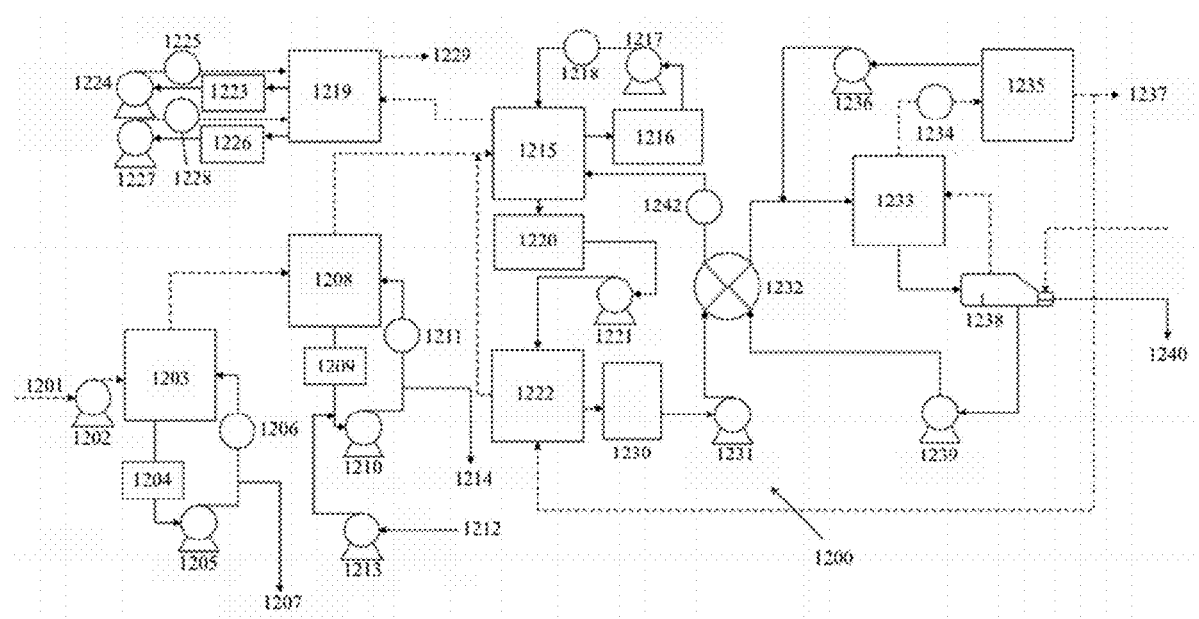
FIG. 8 illustrates a design of a system 1200 for capturing 10 tons of $CO_2$ per day.

FIG. 8 illustrates a system for capturing CO$_2$ 1200. The system for capturing CO$_2$ 1200 can be used to capture 10 tons of CO$_2$ per day. The solid lines in FIG. 8 depict the path of liquids, whilst the dashed lines depict the path of gases.

In this example, flue gas 1201 enters the system 1200 through inlet 1201. In one example, the flue gas 1201 contains 10 vol. % CO$_2$ and is at a temperature of 140° C. The flue gas upon entering system 1200 may pass through a fan 1202. The fan 1202 may be required to overcome the pressure drop in the ductwork as well as the downstream process.

In this example, two operations may be carried out in the system for capturing CO$_2$ 1200.

In the first unit operation, the flue gas 1201 may be cooled in a Direct Contact Cooler (DCC) 1203 by using a loop of water that passes through DCC drum 1204, DCC recirculating pump 1205 and a heat exchanger/DCC cooler 1206. The DCC 1203 may be a RPB. The water may be cooled in a heat exchanger/DCC cooler 1206. Any excess condensate from the flue gas 1201 may be purged via outlet 1207.

The second unit operation may be a SO$_x$ column 1208, which may be used to remove acid gas species such as SO$_x$ and NO$_x$ via an alkali wash. The SO$_x$ column 1208 may be a RPB. A recirculating loop of water passes through SO$_x$ drum 1209, SO$_x$ recirculating pump 1210 and SO$_x$ cooler 1211. The water may be dosed with an alkali 1212 by using a dosing pump 1213. The water may contact the flue gas 1201 in the SO$_x$ column 1208. Excess liquid may be purged from the loop via outlet 1214.

In this example, the flue gas 1201 may then pass into a Carbon Capture Absorber vessel 1215. The Carbon Capture Absorber vessel 1215 may be a RPB. The flue gas 1201 may be contacted with a counter current carbon capture solvent. The Carbon Capture Absorber 1215 has two stages of packing in which the flue gas 1201 and carbon capture solvent are contacted. Between the two stages of packing, the temperature of the carbon capture solvent may be controlled by an intercooling heat exchanger composed of an intercooling exchanger 1218, intercooling pump 1217 and intercooling drum 1216. The flue gas 1201, which may now be depleted of CO$_2$, leaves the Carbon Capture Absorber and passes to a Water Wash vessel 1219. The Water Wash vessel 1219 may be a RPB. The carbon capture solvent, which may now be rich in CO$_2$, may leave the Carbon Capture Absorber via a Rich Solvent Drum 1220; from the Rich Solvent Drum 1220 the carbon capture solvent enters an O$_2$ eliminator 1222 via a Rich Booster Pump 1221.

In this example, the CO$_2$ depleted flue gas 1201 may enter the Water Wash vessel 1219. In the Water Wash vessel 1219, the CO$_2$ depleted flue gas 1201 may be contacted with two recirculating loops of water across two stages of Water Wash packing 1223 and 1226, which are configured in series. Each loop of water 1223 and 1226 is circulated with a wash water pump 1224 and 1227 and cooled in a heat exchanger 1225 and 1228 before being returned to the Water Wash vessel 1219. The treated flue gas 1201 may then pass out of outlet 1229.

In this example, the CO$_2$ rich carbon capture solvent enters the O$_2$ eliminator 1222. The O$_2$ eliminator 1222 may be a RPB. In the O$_2$ eliminator 1222, the CO$_2$ rich carbon capture solvent may be contacted with a flow of carbon dioxide. The CO$_2$ and entrained oxygen may then be returned to the Absorber 1215. The carbon capture solvent, which has had oxygen removed, may be pump through a Surge Drum 1230, Rich Solvent Pump 1231 and a Crossover Heat Exchanger 1232 into the Stripper vessel 1233. A lean cooler 1242 may be positioned between the Cross-over Heat Exchanger 1232 and the Absorber 1215.

In this example, vapor which is generated in a reboiler 1238 may be fed into the Stripper vessel 1233 and used to heat and strip the CO$_2$ from the carbon capture solvent. The Stripper vessel 1233 may be a RPB. A vapor, comprised of steam, vaporized solvent components and CO$_2$ gas, from the Stripper vessel 1233 enters the Reflux Exchanger 1234 where it may be reduced in temperature from 120° C. to 40° C. This causes steam and solvent components to condense into the liquid phase. The stream then passes into the reflux tank 1235 where the gaseous CO$_2$ disengages from the liquid components. The liquid components are then returned as reflux into the carbon capture solvent inventory. The liquid reflux may be pumped by the Reflux Pump 1236 to the Stripper vessel 1233 while the CO$_2$ passes out of the Reflux Exchanger via outlet 1237 as a pure (>95%) stream of CO$_2$. A slipstream of the pure (>95%) stream of CO$_2$ is returned to the O$_2$ eliminator 1222 where it acts as a purge gas in an O$_2$ elimination process.

In this example, the operating pressure of the stripper vessel was 1 bar(g) and the steam that entered the reboiler had an operating pressure of 3.5 bar(g) (saturated). The design pressure of the Stripper, Reboiler, Reflux Exchanger, Reflux Tank, Steam & Condensate system was 10 bar(g).

In this example, the carbon capture solvent (that no longer contains CO$_2$) leaves the Stripper vessel 1233 via the reboiler 1238 where it may be pumped using the Lean Solvent Pump 1239 through the Cross-over Heat Exchanger 1232 and back into the Carbon Capture Absorber vessel 1215 via a lean cooler 1242.

In this example, the DCC 1203, SO$_x$ column 1208 and the Water Wash 1219 may be situated on separate RPB shafts.

Example 8: Sizing RPB Process Equipment

In this example, process simulation software, such as ProTreat™ (as provided by Optimized Gas Treating, Inc.), was used to size conventional static technology and then the methodology of example 5 was used to size the RPB equipment.

Table 7 illustrates the comparative process equipment dimensions for a RPB and conventional static technologies that can capture 10 tons of $CO_2$ per day from a 10 vol. % $CO_2$ flue gas source.

TABLE 7 comparative process equipment dimensions for a RPB and conventional static technologies that can capture 10 tons of $CO_2$ per day from a 10 vol. % $CO_2$ flue gas source.

| | Technology Type | | | | | |
| | RPB | | | Conventional (static) | | |
| | Axial | | | | | |
| Vessel | Radius m | Length m | Volume $m^3$ | Diameter m | Height m | Volume $m^3$ |
| DCC | 0.52 | 0.34 | 0.28 | 0.72 | 5.00 | 2.04 |
| $SO_2$ Absorber | 0.32 | 0.29 | 0.10 | 0.72 | 5.00 | 2.04 |
| $CO_2$ Absorber | 0.72 | 0.23 | 0.38 | 0.67 | 12.00 | 4.23 |
| $O_2$ Eliminator | 0.72 | 0.23 | 0.38 | N/A | N/A | N/A |
| Stripper | 0.25 | 0.23 | 0.05 | 0.43 | 8.00 | 1.16 |
| Water Wash | 0.56 | 0.57 | 0.55 | 0.63 | 6.00 | 1.87 |

Table 7 shows comparative data for the equipment dimensions of a RPB and a conventional static equivalent technology. Table 7 shows that the volume of the packing required to achieve 90% $CO_2$ capture for the RPB process equipment is reduced by, or close to, an order of magnitude.

Example 9: Sizing Auxiliary Process Equipment Used in RPB Containing System

In this example, process simulation software, such as ProTreat™ (as provided by Optimized Gas Treating, Inc.), was used to size auxiliary process equipment used in an RPB containing system according to example 8.

Tables 8, 9 and 10 illustrate the equipment dimensions for a RPB technology that can capture 10 tons of $CO_2$ per day from a 10 vol. % $CO_2$ flue gas source. In the tables, the specification of the pumps, fans, heat exchangers and tanks required for such a plant is shown.

TABLE 8

Specification parameters of pumps and fans for RPB technology.

| Name | Type | Capacity $m^3 \, hr^{-1}$ | Operating Temperature ° C. | Discharge Pressure bar(a) | Power kW | Material of construction |
|---|---|---|---|---|---|---|
| DCC Recirc. Pump | Centrifugal | 14.8 | N/A | 4.3 | 2.35 | 304 SS |
| SOx Recirc. Pump | Centrifugal | 14.8 | 43 | 4.3 | 2.35 | 304 SS |
| Rich Solvent Pump | Centrifugal | 5.6 | 46 | 5.8 | 1.2 | 304 SS |
| Lean Solvent Pump | Centrifugal | 6 | 120 | 4.4 | 0.95 | 304 SS |
| Gas Booster Fan | Centrifugal | 3,700 | 150 | 0.13 (dP) | 17 | 304 SS |
| Water Wash Recirc. Pump 1 | Centrifugal | 5.1 | 60 | 2.7 | 0.51 | 304 SS |
| Water wash Recirc. Pump 2 | Centrifugal | 6.1 | 40 | 3.2 | 0.74 | 304 SS |
| Water wash condensate Pump | Centrifugal | 0.23 | 40 | 2.0 | 0.02 | 304 SS |
| Steam Condensate Pump | Centrifugal | 0.7 | 140 | 3.3 | 0.1 | 304 SS |
| Reflux Pump | Centrifugal | 0.28 | 120 | 3.4 | 0.04 | 304 SS |
| Solvent Makeup | Centrifugal/ PD pump | 0.2 | Ambient | 1.8 | 0.01 | 304 SS |
| Alkali Dosing Pump | Centrifugal | 0.2 | Ambient | 1.8 | 0.01 | 304 SS |
| Rich Booster Pump | Centrifugal | 5.6 | 46 | 2 | 0.5 | 304 SS |
| Intercooling Pump | Centrifugal | 4.6 | 55 | 2.7 | 0.46 | 304 SS |

TABLE 9

Specification parameters of heat exchangers for RPB technology.

| Name | Type | Heat Duty MJ hr$^{-1}$ | Design Pressure bar(g) | MoC |
|---|---|---|---|---|
| DCC Cooler | Plate and Frame | 950 | 3.0 | SS304L |
| SO$_x$ Cooler | Plate and Frame | 172 | 3.0 | SS304L |
| Intercooling Exchanger | Plate and Frame | 239 | 4.5 | SS304L |
| Cross-over HX | Plate and Frame | 1372 | 5.0 | SS316L |
| Reflux Exchanger | Shell and Tube | 580 | 2.0 | SS304L |
| Lean Cooler | Plate and Frame | 183 | 4.5 | SS304L |
| Water Wash Cooler 1 | Plate and Frame | 252 | 3.5 | SS304L |
| Water Wash Cooler 2 | Plate and Frame | 308 | 3.5 | SS304L |
| Stripper Reboiler | Kettle Type | 1560 | 1.0 | SS316L |

TABLE 10

Specification parameters of tanks for RPB technology.

| Name | Volume m$^3$ | Operating Temperature ° C. | Operating Pressure bar(g) | MoC |
|---|---|---|---|---|
| DCC Drum | 0.3 | 56 | 0 | 304 SS |
| SOx Drum | 0.3 | 44 | 0 | 304 SS |
| Intercooling Drum | 0.09 | 61 | 0 | 304 SS |
| Rich Solvent Drum | 0.12 | 46 | 0 | 304 SS |
| WW Drum 1 | 0.1 | 58 | 0 | 304 SS |
| WW Drum 2 | 0.12 | 50 | 0 | 304 SS |
| Surge Drum | 0.12 | 46 | 0 | 304 SS |
| Reflux Tank | 0.12 | 120 | 1 | 304 SS |
| Solvent Storage Tank | 2.60 | 40 | 0 | 304 SS |
| Steam Condensate Drum | N/A | N/A | N/A | CS + 1.5 mm CA |

The present application shows that the volume of the packing required to achieve 90% CO$_2$ capture for the RPB process equipment is reduced by, or close to, an order of magnitude. This is beneficial at least because of the reduction in capital expenditure and reduction in size in providing the same or a greater CO$_2$ capture capability. Utilising RPBs as described in the present application provides benefits over known systems.

Although the present disclosure and its advantages have been described in detail, it should be understood that various changes, substitutions, and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A process of capturing Carbon Dioxide (CO$_2$) from flue gases, the process comprising the steps of:
    (a) providing a carbon capture solvent;
    (b) introducing the carbon capture solvent into a Rotary Packed Bed (RPB) absorber and a Rotary Packed Bed (RPB) stripper;
    (c) applying steam to a reboiler;
    (d) bringing the carbon capture solvent in the Rotary Packed Bed (RPB) stripper to a desired pressure;
    (e) pumping the carbon capture solvent around the Rotary Packed Bed (RPB) absorber and the Rotary Packed Bed (RPB) stripper;
    (f) introducing flue gas into the Rotary Packed Bed (RPB) absorber;
    (g) monitoring production of Carbon Dioxide (CO$_2$) from the Rotary Packed Bed (RPB) stripper;
    (h) starting a Rotary Packed Bed (RPB) O$_2$ eliminator; or, starting a conventional packed bed O$_2$ eliminator;
    (i) stopping the flow of flue gas to the Rotary Packed Bed (RPB) absorber;
    (j) monitoring production of Carbon Dioxide (CO$_2$) from the Rotary Packed Bed (RPB) stripper until Carbon Dioxide (CO$_2$) production has stopped;
    (k) stopping supply of steam to the reboiler;
    (l) stopping circulation of the carbon capture solvent;
    (m) stopping rotation of the Rotary Packed Bed (RPB) stripper, absorber, and O$_2$ eliminator.

2. The process of claim 1, wherein the process further comprises the step of: thermally regenerating the carbon capture solvent reacted with the CO$_2$ for re-utilizing the carbon capture solvent in the process.

3. The process of claim 1, wherein the process further comprises the step of: passing the flue gas through one or both of a water wash and an acid wash to remove traces of the carbon capture solvent present in the flue gas; and step (m) further comprising stopping rotation of the water wash, the acid wash, or, when both are present, both.

4. The process of claim 3, wherein one or both of the water wash and the acid wash are conducted on separate Rotary Packed Beds (RPBs).

5. The process of claim 1, wherein a housing of at least one of the RPBs is mounted on a rotatable disk.

6. The process of claim 1, wherein the step of introducing the flue gas comprising CO$_2$ to the Rotary Packed Bed (RPB) absorber comprises feeding the flue gas to two, three, four, five or six Rotary Packed Bed (RPB) absorbers.

7. The process of claim 6, wherein the two, three, four, five or six Rotary Packed Bed (RPB) absorbers are arranged in series on a common shaft.

8. The process of claim 1, wherein the carbon capture solvent reacts with the flue gas in a counter-current flow to remove CO$_2$ from the flue gas and form CO$_2$ rich solvent.

9. The process of claim 8, wherein the Rotary Packed Bed (RPB) stripper produces a CO$_2$ lean solvent from the CO$_2$ from the CO$_2$ rich solvent.

10. The process of claim 9, wherein the RPB stripper is a stripper column, a stripper static column, or a RPB stripper.

11. The process of claim 9, wherein the CO$_2$ lean solvent is re-introduced into the Rotary Packed Bed (RPB) absorber.

12. The process of claim 1, wherein the Rotary Packed Bed (RPB) O$_2$ eliminator or conventional packed bed O$_2$ eliminator eliminates 90% or more of the $O_2$ present in the $CO_2$ rich solvent formed from the Rotary Packed Bed (RPB) absorber.

13. The process of claim 1, wherein each Rotary Packed Bed (RPB) has the following dimensions:
   radius: from 0.2 m to 1.25 m, or from 0.2 m to 0.8 m,
   axial length: from 0.02 m to 1.0 m, or from 0.2 m to 0.6 m,
   volume: from 0.04 $m^3$ to 4.9 $m^3$, or from 0.04 $m^3$ to 0.6 $m^3$.

14. The process of claim 1, wherein the carbon capture solvent comprises at least one of
   a tertiary amine
   a sterically hindered amine
   a polyamine,
   a carbonate buffer salt,
   water, or
   a combination thereof.

15. The process of claim 14, wherein the carbon capture solvent has a viscosity from 1 cp to 100 cp.

16. The process of claim 14, wherein the carbon capture solvent
   comprises at least one of:
      a tertiary amine,
      a sterically hindered amine,
      a polyamine,
      a carbonate buffer
      water, or
      a combination thereof.

17. The process of claim 16, wherein at least one of:
   (a) the tertiary amine is N-methyl-diethanolamine, 2-(diethylamino)ethanol, or a combination thereof;
   (b) the sterically hindered amine is 2-amino-2-ethyl-1,3-propanediol; 2-amino-2-hydroxymethyl-1,3-propanediol; 2-amino-2-methyl-1-propanol, or a combination thereof;
   (c) the polyamine is 2-piperazine-1-ethylamine, 1-(2-hydroxyethyl)piperazine, or a combination thereof;
   (d) the carbonate buffer is potassium carbonate;
   (e) the water is deionised water; or
   (f) a combination thereof.

18. The process of claim 14, wherein the carbon capture solvent includes water, an amino hindered alcohol and a polyamine.

19. The process of claim 18, wherein the amino hindered alcohol is amino-2-methyl-1-propanol, the polyamine is amino ethyl piperazine, or a combination thereof.

20. The process of claim 14, wherein the water is present in the carbon capture solvent in an amount from 10 wt % to 70 wt. % of the carbon capture solvent.

21. The process of claim 1, wherein step (b) or step (h) further includes introducing the carbon capture solvent into an $O_2$ eliminator.

* * * * *